United States Patent [19]

Stokes

[11] Patent Number: 5,612,902
[45] Date of Patent: Mar. 18, 1997

[54] METHOD AND SYSTEM FOR ANALYTIC GENERATION OF MULTI-DIMENSIONAL COLOR LOOKUP TABLES

[75] Inventor: Michael Stokes, Cupertino, Calif.

[73] Assignee: Apple Computer, Inc., Cupertino, Calif.

[21] Appl. No.: 304,838

[22] Filed: Sep. 13, 1994

[51] Int. Cl.⁶ .................................................. H04N 1/50
[52] U.S. Cl. ........................ 364/526; 358/504; 358/523
[58] Field of Search ........................... 364/526; 358/522, 358/530, 504, 501, 527, 518, 517, 300, 523; 347/115, 19; 395/109, 131

[56] References Cited

U.S. PATENT DOCUMENTS

| | | | |
|---|---|---|---|
| 5,081,529 | 1/1992 | Collette | 358/504 |
| 5,305,119 | 4/1994 | Rolleston et al. | 358/522 |
| 5,313,291 | 5/1994 | Appel et al. | 358/501 |
| 5,333,069 | 7/1994 | Spence | 358/517 |
| 5,398,124 | 3/1995 | Hirota | 358/530 |
| 5,416,613 | 5/1995 | Rolleston et al. | 358/518 |
| 5,438,649 | 8/1995 | Ruetz | 395/109 |
| 5,508,826 | 4/1996 | Lloyd et al. | 358/501 |

FOREIGN PATENT DOCUMENTS

| | | |
|---|---|---|
| 477730 | 4/1992 | European Pat. Off. . |
| 4341871 | 6/1994 | Germany . |
| WO93/20648 | 10/1993 | WIPO . |

OTHER PUBLICATIONS

*International Search Report, International Appln. No. PCT/US95/11550* Date of mailing: Jan. 4, 1996.
"Modeling the Color of Multi-Colored Halftones", J. A. Stephen VIGGIANO, RIT Research Corp., Graphics Div., Technical Association of the Graphic Arts, 1990, pp. 44–62.
"ColorSync™ 2.0 Profile Format", Version 2.4—Mar. 14, 1994, Michael Stokes, Chairman ColorSync™ Profile Consortium, pp. 1–56.

*Primary Examiner*—James P. Trammell
*Attorney, Agent, or Firm*—Burns, Doane, Swecker & Mathis, L.L.P.

[57] ABSTRACT

A method and system for automatic characterization of a color printer are described. A relatively few number of test samples are printed and measured to create an analytic model which characterizes a printer. This analytical model, in turn, is used to generate a multidimensional lookup table which can then be used at runtime to compensate image input and create desired visual characteristics in the printed image. A detector can be incorporated into the printer which measures at least one parameter of each printed sample so that characterization can be carried out internally to the printer in a manner which is transparent to the end user. In this way, changes in paper stock, inks, or environment can be custom compensated for each printing application.

20 Claims, 3 Drawing Sheets

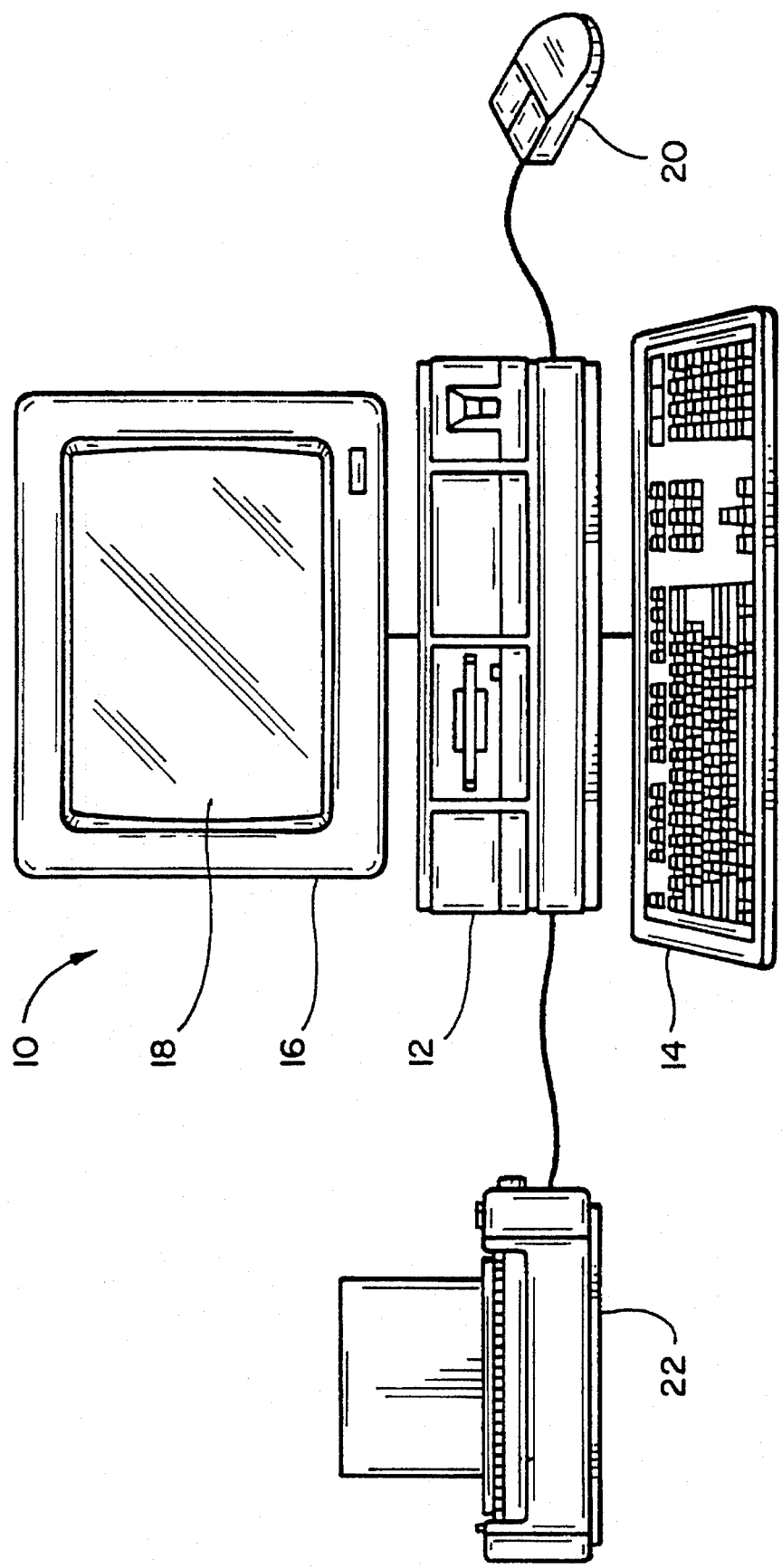
FIG_1

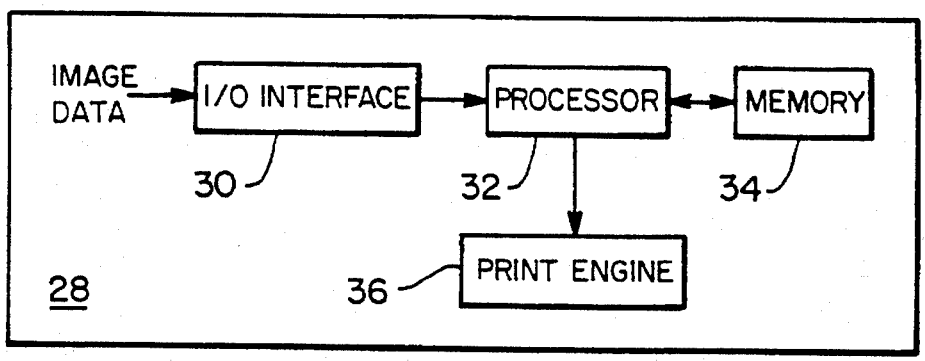

FIG_2

| c=0%<br>m=0%<br>y=0%<br>k=0% | c=100%<br>m=0%<br>y=0%<br>k=0% | c=0%<br>m=100%<br>y=0%<br>k=0% | c=0%<br>m=0%<br>y=100%<br>k=0% | c=0%<br>m=100%<br>y=100%<br>k=0% | c=100%<br>m=0%<br>y=100%<br>k=0% | c=100%<br>m=100%<br>y=0%<br>k=0% | c=100%<br>m=100%<br>y=100%<br>k=0% |
|---|---|---|---|---|---|---|---|
| c=0%<br>m=0%<br>y=0%<br>k=100% | c=100%<br>m=0%<br>y=0%<br>k=100% | c=0%<br>m=100%<br>y=0%<br>k=100% | c=0%<br>m=0%<br>y=100%<br>k=100% | c=0%<br>m=100%<br>y=100%<br>k=100% | c=100%<br>m=0%<br>y=100%<br>k=100% | c=100%<br>m=100%<br>y=0%<br>k=100% | c=100%<br>m=100%<br>y=100%<br>k=100% |
| c=75%<br>m=0%<br>y=0%<br>k=0% | c=50%<br>m=0%<br>y=0%<br>k=0% | c=25%<br>m=0%<br>y=0%<br>k=0% | c=0%<br>m=75%<br>y=0%<br>k=0% | c=0%<br>m=50%<br>y=0%<br>k=0% | c=0%<br>m=25%<br>y=0%<br>k=0% | c=0%<br>m=0%<br>y=75%<br>k=0% | c=0%<br>m=0%<br>y=50%<br>k=0% |
| c=0%<br>m=0%<br>y=25%<br>k=0% | c=0%<br>m=0%<br>y=0%<br>k=75% | c=0%<br>m=0%<br>y=0%<br>k=50% | c=0%<br>m=0%<br>y=0%<br>k=25% | c=25%<br>m=25%<br>y=0%<br>k=0% | c=25%<br>m=0%<br>y=25%<br>k=0% | c=25%<br>m=0%<br>y=0%<br>k=25% | c=0%<br>m=25%<br>y=25%<br>k=0% |
| c=0%<br>m=25%<br>y=0%<br>k=25% | c=0%<br>m=0%<br>y=25%<br>k=25% | c=75%<br>m=75%<br>y=0%<br>k=0% | c=75%<br>m=0%<br>y=75%<br>k=0% | c=75%<br>m=0%<br>y=0%<br>k=75% | c=0%<br>m=75%<br>y=75%<br>k=0% | c=0%<br>m=75%<br>y=0%<br>k=75% | c=0%<br>m=0%<br>y=75%<br>k=75% |
| c=75%<br>m=25%<br>y=0%<br>k=0% | c=75%<br>m=0%<br>y=25%<br>k=0% | c=75%<br>m=0%<br>y=0%<br>k=25% | c=0%<br>m=75%<br>y=25%<br>k=0% | c=0%<br>m=75%<br>y=0%<br>k=25% | c=0%<br>m=0%<br>y=75%<br>k=25% | c=25%<br>m=75%<br>y=0%<br>k=0% | c=25%<br>m=0%<br>y=75%<br>k=0% |
| c=25%<br>m=0%<br>y=0%<br>k=75% | c=0%<br>m=25%<br>y=75%<br>k=0% | c=0%<br>m=25%<br>y=0%<br>k=75% | c=0%<br>m=0%<br>y=25%<br>k=75% | | | | |

FIG_3

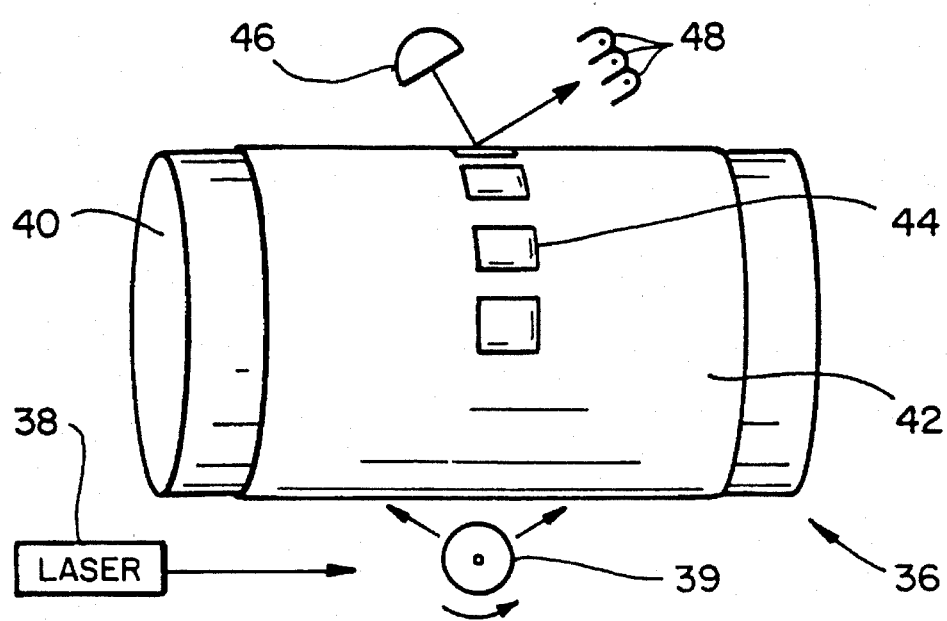
FIG_4
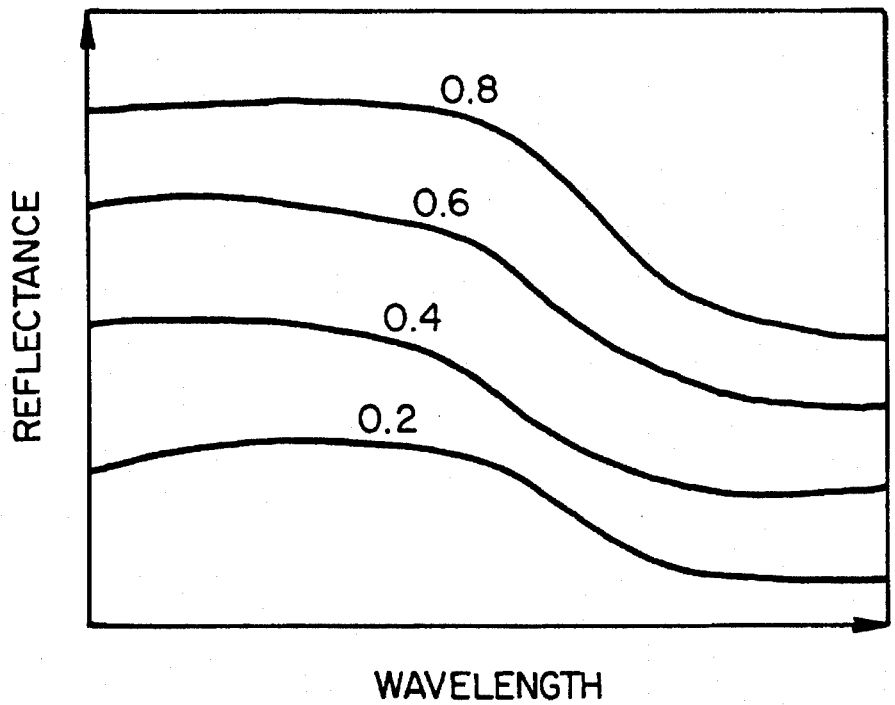
FIG_5

METHOD AND SYSTEM FOR ANALYTIC GENERATION OF MULTI-DIMENSIONAL COLOR LOOKUP TABLES

BACKGROUND

The present invention relates in general to computer systems, and in particular to peripheral devices used in computer systems. Still more particularly, the present invention relates to a method and system for using analytical color models to automatically, or rapidly manually, generate multi-dimensional color lookup tables.

As computing moves into the multimedia era, the days in which color was an unneeded luxury and monochrome monitors were commonplace, have given way to color image processing being an integral feature used by most applications. As the commercial demand for color grew, so too did the complexity of the hardware and software which was designed in response to that demand. Many color image processing techniques have been developed to deal with the issues raised by the integration of color into the computing paradigm.

Color matching is one such technique, which is used when transferring color images and documents between color devices, such as monitors, scanners and printers. Color matching is a useful interface technique because color devices have different color capabilities, describe color in different terms and operate in different color spaces. For example, a color display monitor in a computer system may create and describe colors in terms of red, green and blue ("rgb") values, and is then said to work in the RGB color space. The rgb values associated with particular colors for this display monitor are device dependent, meaning the rgb values associated with specific colors are particular for that monitor or brand of monitor. Because the rgb values are device dependent, colors displayed on different monitors will probably not be visually identical even for the same rgb input values.

Most printers create and describe colors in device dependent terms differing from those used by monitors. Printers use, for example, cyan, magenta, yellow and black ("cmyk") values to describe colors, and are said to work in the CMYK color space. Again, because the cmyk values are device dependent, colors printed on any given printer will probably not match colors printed on a different printer for the same cmyk values.

Further complicating color matching between color devices is that different color devices have different color capabilities. Every color device, such as a scanner, printer, or monitor, has a range of colors that it can produce. This range of producible colors is known as a gamut. To exemplify the difficulties caused by differing device gamuts, consider monitors and printers. Those skilled in the art will recognize that color display monitors can produce and display hundreds to thousands of colors. Color printers, however, typically have a smaller number of printable colors. Consequently, in most situations the gamut for a color display monitor exceeds the gamut for a color printer. As a result some colors displayed on display monitors cannot be produced by color printers.

Color matching techniques use models to translate colors between devices while trying to maintain the perceived color appearance. For example, suppose that a user creates an image on a monitor. If she or he prints this image without any color matching, the color appearance of the printed image will differ significantly from that of the original. Using a color matching model, this change can be reduced to a perceptionally acceptable level.

Conventionally, two different types of models have been created to simulate printer operation. Empirical models essentially treat a printer as a black box having an image input and an image output. A large number of test color samples are printed. Each color sample which has been printed is then measured to determine that particular printer's response to that test sample input. Using the measured data, one can create a multi-dimensional lookup table which compensates the printer's response so that the electronic image input to the printer results in the desired printed image. However, using empirical models requires anywhere from about a thousand samples to many thousands of samples to provide an accurate lookup table. Accordingly, such a methodology is too complex to be performed by printer users and is usually only done at the factory for an entire production run of printers. Thus, this technique fails to provide users with the ability to create customized compensation values for various paper stock, inks, etc.

Analytical models, on the other hand, attempt to characterize printer response using the fewest number of measurements possible to arrive at functions which can be used to predict a printer's image output for a sufficient number of different image inputs. These types of models have been under development since the 1930's and historically have not been sufficiently accurate to provide perceptionally acceptable color correction. However, a more accurate analytical model has recently been developed and is disclosed in "Modeling the Color of Multi-Colored Half Tones" authored by J. A. Steven Viggiano in the 1990 proceedings of the Technical Association of the Graphic Arts. According to this analytical model, which is described in greater detail below, a printer can be accurately characterized using only, for example, sixty-one measurements. While analytical models provide a characterization of a printer based on many fewer measured test samples than are required for empirical models, the complexity of these models renders compensation calculations for each pixel of each input image too slow for runtime application.

Another way in which conventional systems have attempted to deal with the problems presented by the different responses of printers to the same color input is to provide a color detector inside the printer which can measure the printer's response by sensing the toners on the printer drum. However, this sensing function does not feed back information for further processing and, therefore, these conventional printers can only provide coarse tone reproduction characteristics and cannot correct for hue or colorfulness offset. Moreover, since these conventional printers read from the drum, they are unable to compensate for changes in reproduced color perception which occur due to different types of media and the ways in which the colorants interact with the paper.

SUMMARY

These and other drawbacks and limitations of conventional techniques are overcome according to the present invention which, among other features, uses an analytical model to create a multi-dimensional lookup table. The multi-dimensional lookup table is then used during runtime to correct an input image so that it is printed with the desired visual characteristics. By using an analytical model, the number of samples to be measured is reduced to an extent that it is feasible for end users to characterize individual printers for specific environments or applications, i.e., new inks, paper stocks or environment.

According to exemplary embodiments of the present invention, a detector can be incorporated into the printer so that the characterization can be performed in a manner which is transparent to the end user. For example, upon an input from a user, e.g., a pressed button, at the power on of the printer, at the beginning of each new print job, or for each new media, a printer can begin an automatic characterization process. First, the printer will print a test target which includes whatever number of samples are needed by the analytical model to characterize the printer's response over the available color spectrum. After this test target is printed on the media, the media is scanned by the detector which is built into the printer and which senses the actual colors which have been printed in response to the request to print the test target. A processor in the printer uses the information received from the detector to create an analytical model for that printer which is based on the colorants (e.g., inks) which are currently being used and the particular media on which the test target was printed. Using this analytical model, the processor creates a multi-dimensional lookup table and stores that table in memory in the printer. Subsequent images which are printed use the multi-dimensional lookup table to determine the appropriate compensation values for each color of the image to be printed.

In this way, an end user is able to automatically characterize the printer for a custom print job which is specific to the colorants and media being used. Moreover, since an analytical model is used the initial characterization will be relatively rapid since only a few, e.g., less than one hundred, samples need be measured. The compensation values stored in the multi-dimensional lookup table according to the present invention will compensate both for tone reproduction characteristics (i.e., contrast) and for hue or colorfulness variations. Since exercising the analytical model is relatively slow, the multi-dimensional lookup table is created for runtime since it provides a relatively rapid way to compute data.

According to exemplary embodiments of the present invention, the detector which is built into the printer can comprise sensors which are capable of measuring the reflectance values of the printed target samples, for example the rgb values of the samples, which values can then be plugged directly into the analytical model by the processor. This provides end users with transparent, individualized printer characterization.

According to other exemplary embodiments, on the other hand, a less complex sensor can be used which simply measures the density of the printed target samples. Given this density information, and a priori knowledge of the composition of the test target samples and the media upon which the test target is printed, the reflectance values can be approximated and the multi-dimensional lookup table created as in the other exemplary embodiments.

According to still other exemplary embodiments, the measurement of the test color samples can be performed externally of the printer and the measured data input into the system to be used to create the analytical model.

BRIEF DESCRIPTION OF THE DRAWINGS

The present invention, as well as an exemplary mode of use, and further objects and advantages thereof, will best be understood by reference to the following detailed description of an illustrative embodiment when read in conjunction with the accompanying drawings, wherein:

FIG. 1 illustrates a computer system which may be used to implement the method and system for automatically generating printer profiles according to the present invention;

FIG. 2 is a generalized block diagram of a color printer;

FIG. 3 is an exemplary test target;

FIG. 4 is an illustration of an exemplary print engine according to the present invention; and FIG. 5 is a graph illustrating a plurality of exemplary spectral reflectance curves.

DETAILED DESCRIPTION

With reference now to the figures and in particular with reference to FIG. 1, a computer system is illustrated which may be used in conjunction with methods and systems for analytically generating color look-up tables according to the present invention. Computer system 10 includes a computer 12, keyboard 14, a color display monitor 16 having a display screen 18, a cursor control device 20, shown here as a mouse, and a printer 22. Computer system 10 may be implemented using any suitable computer, such as a Macintosh Quadra™ computer, a product of Apple Computer, Incorporated, located in Cupertino, Calif. Printer 22 can be any color printer, such as a Color Stylewriter Pro™ printer also a product of Apple Computer, Incorporated, which may be modified in the various ways described below.

Now focusing on the printer element of the aforedescribed system, FIG. 2 provides a very general block diagram illustrating functional units of an exemplary color printer 28 which will be used to describe color compensation according to the present invention. Therein, block 30 represents an I/O interface which receives image data from some external source, such as computer 12 or any other color device. This image data is then transferred to processor 32 which coordinates the activities of the other elements in the printer. The image data which is received by I/O interface 30 will be described in terms of the XYZ color space since such input image data is commonly provided in that color space. However, those skilled in the art will understand that the present invention can be applied to input image data which is expressed in any color space.

As each printer is somewhat different in its response to the input image data, printers will provide an optimal image output only if the input image data is adjusted before being sent to print engine 36. According to the present invention, this compensation is provided by, for example, a multidimensional look-up table which is stored in memory device 34. Thus, when processor 32 receives input image data indicating that certain colors are to be printed, it retrieves the corresponding compensation values from the three-dimensional look-up table in memory 34 and provides a compensated image data signal to the print engine 36 so that the actual printed output has the visual characteristics, i.e., contrast, hue and/or colorfulness, that are desired. The way in which the multidimensional look-up table which is stored in memory 34 is created according to exemplary embodiments of the present invention will now be described.

First, the printer characterization can be initialized to take into account its current environment, for example, the paper stock, inks, and ambient conditions that are currently experienced by the printer, by providing some type of user command or default instructing the printer to begin an initialization function. For example, this input could include a depression of an initialize button on the printer housing, or it could be a signal sent from the computer system to the printer via I/O interface 30. Upon receipt of the initialization signal, processor 32 will instruct the print engine to print a test target of color samples which the processor retrieves from memory 34. The make-up of the test target can be stored in memory 34 and should provide sufficient color samples in order to yield the data necessary to construct the analytical model of the printer. Since different analytical models can be used to implement the present invention, a wide variety of different test targets could be provided as the test target which is stored in memory 34.

As one example of a test target which could be used to provide sufficient information for the exemplary Viggiano analytical model described below, the spectral reflectance values for the sixteen ink combinations (primaries) used in that model can be obtained by printing and measuring samples of those primaries having 100% coverage. The dot gain parameters used in the Viggiano model can be obtained by printing a step wedge of samples for the cyan, magenta, yellow and black colorants, for example, five sample steps per colorant should be sufficient to obtain an acceptable fit between the dot gain parameters and the film and paper using non-linear regression. The Yule-Nielsen n factor, also used in the exemplary analytical model described below, can be obtained by using non-linear modeling techniques in combination with a small number of samples, for example, 25 samples. This subset of samples can be weighted appropriately to represent the type of colors which are most often to be printed. This weighting feature can be accomplished, for example, by either uniformly sampling the printer gamut or by using the exemplary print sample illustrated in FIG. 3 in combination with samples that represent known objects to be printed, such as skin tone and blue sky color. The test target illustrated in FIG. 3 includes the 61 samples described above minus those which are redundant.

Having printed the test target, the next step is to measure the spectral reflectances of the target samples which have been printed by the print engine 36. This can be accomplished in a variety of ways. For example, a user can manually measure these samples using a colorimeter or spectrophotometer and input the data into processor 32. This data can be input, for example, by downloading the measurements made by the colorimeter or spectrophotometer into the computer 12 or processor 32. According to other exemplary embodiments of the present invention, however, a detector can be built into the printer which will measure these spectral reflectances so that the entire process of printer characterization is transparent to the user, as will now be described.

FIG. 4 illustrates a more detailed version of print engine 36 according to an exemplary embodiment of the present invention. The print engine illustrated in FIG. 4 is of the electrophotographic type, however, those skilled in the art will recognize that the present invention can also be applied to other types of color printers, e.g., ink jet printers. In FIG. 4, the laser 38 is reflected from scanning mirror 39 to provide a latent image on the electrophotographic drum 40. Not shown in the illustration of FIG. 4 is the controller which controls the modulation of the laser 38 and the rotation of the scanning mirror 39 to provide the desired latent image. The latent image on the drum 40 is then transferred to the paper media 42 by application of various toners. As a result, when the test input image data is sent to the controller by processor 32 (not shown), the single color patches 44 are printed on the media 42. As the media moves past the light source 46, the test patches 44 are illuminated and the reflected light is detected by the detector 48. Information received from the detector 48 is then transmitted back to processor 32.

According to the exemplary embodiment illustrated in FIG. 4, the detector 48 is capable of directly measuring the reflectance values of the printed test target samples and communicating these values to processor 32 which inserts them into the analytical model described below. However, according to another exemplary embodiment of the present invention which will now be described, the detector 48 can be replaced with a single, less complicated sensor which measures only the density of the printed target samples. Using this density information, the processor 32 can approximate the reflectance values. This exemplary embodiment will be described in conjunction with FIG. 5.

A less complicated sensor which measures only the density of the color samples, rather than the wavelength of light reflected therefrom, can be used in situations where a priori knowledge of the test target to be printed and of the print stock and ink used in the printer is available. Consider that, as shown in FIG. 5, the spectral relationships between various densities of a particular colorant, for example, cyan, and spectral reflectances over a range of wavelengths can be measured for any given paper stock and colorant. Therein, each curve is for a different density and is expressed as reflectance given wavelength. These curves can then be stored for each colorant and media in memory 34 prior to shipping the printer. Given this a priori knowledge, by measuring the density of the printed test target sample, the processor 32 can then select a corresponding spectral reflectance curve from the stored spectral curves. For example suppose that a certain test patch of cyan is measured as having a density of 0.4. The processor 32 would then select the 0.4 density curve for cyan printed on the test target media, for example the 0.4 curve shown in FIG. 5.

Having determined the spectral reflectance values for the colorants in each of the printed test target samples in either of the foregoing exemplary ways, the processor 32 can then establish the analytical model for the printer.

As mentioned previously, an analytical model which is capable of expressing the output of a printer as a function of its input is used in exemplary embodiments of the present invention rather than an empirical model to reduce the number of measured samples which are required. As an example, an analytical model described in "Modeling the Color of Multi-Colored Half Tones" by J. A. Steven Viggiano, Proceedings of the Technical Association of the Graphic Arts, which disclosure is incorporated here by reference, will now be described. Those skilled in the art will readily appreciate, however, that this particular analytical model is described here only to illustrate the present invention and that any analytical printer model can be substituted therefor. This exemplary model predicts the reflectance values of colors resulting from inputs to the printer which are in the form of the half-tone dot areas of combinations of cyan, magenta, yellow and black inks. The equation below encompasses this model.

$$R'\lambda = a_p R'_{\lambda p} +$$
$$a_c R'_{\lambda c} + a_m R'_{\lambda m} + a_y R'_{\lambda y} +$$
$$a_r R'_{\lambda r} + a_g R'_{\lambda g} + a_b R'_{\lambda b} +$$
$$a_3 R'_{\lambda 3} + a_k R'_{\lambda k} + a_4 R'_{\lambda 4} +$$
$$a_{ck} R'_{\lambda ck} + a_{mk} R'_{\lambda mk} + a_{yk} R'_{\lambda yk} +$$
$$a_{rk} R'_{\lambda rk} + a_{gk} R'_{\lambda gk} + a_{bk} R'_{\lambda bk}$$

$R_\lambda'$ is computed for each wavelength ($\lambda$) in order to generate the entire reflectance spectrum. Typically, the wavelengths of interest can range from, for example, 400 nanometers to 700 nanometers in increments of 10 or 20 nanometers. The $R'_x$ values, given by the equation:

$$R'_x = R_x^{1/n}$$

represent the reflectance values adjusted by the Yule-Nielsen n factor as described in the Viggiano article.

The paper dot area parameters are derived from the paper dot area values for each individual colorant as shown, for example, by the equations as follows.

$$a_p = (1-c)(1-m)(1-y)(1-k)$$
$$a_c = C(1-m)(1-y)(1-k)$$
$$a_m = (1-c)m(1-y)(1-k)$$
$$a_y = (1-c)(1-m)y(1-k)$$
$$a_r = (1-c)my(1-k)$$
$$a_r = (1-c)my(1-k)$$
$$a_g = c(1-m)y(1-k)$$
$$a_b = cm(1-y)(1-k)$$
$$a_k = (1-c)(1-m)(1-y)k$$
$$a_4 = cmyk$$
$$a_{ck} = c(1-m)(1-y)k$$
$$a_{mk} = (1-c)m(1-y)k$$
$$a_{yk} = (1-c)(1-m)yk$$
$$a_{rk} = (1-c)myk$$
$$a_{gk} = c(1-m)yk$$
$$a_{bk} = cm(1-y)k$$

The paper dot areas for each individual colorant are computed from the film dot areas using the equation $a_p = a_f + 2\Delta_p[a_f(1-a_f)]^{1/2}$.

Finally, $a_f = a_d + 2\Delta_f[a_d(1-a_d)]^{1/2}$ provides the transformation from digital halftone value into film dot area. An alternative to using the previous two equations is to use a curve fit technique, e.g., b-splines, to create a dot gain transfer function. For all of these equations, p represents paper, c is cyan, m is magenta, y is yellow, r is red, g is green, b is blue, f is film, d is digital halftone, a is dot area, and R is reflectance value.

Thus, given the reflectance values of the sixteen primaries, a value for the Yule-Nielsen n factor, values for the dot gain parameters $\delta_f$ and $\delta_p$ and digital dot area values for cyan, magenta, yellow and black, a resulting reflectance value can be accurately predicted for any given color input.

From this predicted reflectance value, XYZ tristimulus values can be computed as described, for example, in the CIE Publication 15.2 entitled "Colorimetry", which disclosure is incorporated here by reference.

Accordingly, the analytical model gives the processor 32 the ability to translate cmy values into XYZ values, i.e., the model expresses XYZ=f(cmy). However, to apply the analytical model to determine the tristimulus XYZ values for every cmy value in an input image data signal is computationally too slow for runtime applications. Thus, according to the present invention, the model can be used to generate values to create a multidimensional look-up table by, for example, the following the exemplary pseudocode which table will then be stored in memory 34.

For (c=0.00 to 1.00 Step 0.10)
  For (m=0.00 to 1.00 Step 0.10)
    For (y=0.00 to 1.00 Step 0.10)

XYZ=f(c,m,y)

Next y
  Next m
Next c

As can be seen from the above exemplary pseudocode, a three-dimensional look-up table is generated having XYZ values at spaced intervals for corresponding cmy values. Although the above exemplary pseudocode illustrates XYZ values being calculated for cmy values at 10% increments, those skilled in the art will readily appreciate that more or fewer values could be generated for the look-up table depending upon the amount of memory available and other design criteria. The resulting multidimensional look-up table structures can have additional components other than the actual values in the table including, for example, one dimensional linearization tables which provide the capability to make minor adjustments to the overall compensation scheme without entirely recreating the analytical model. Given these multidimensional table structures, a printer profile can easily be generated by maintaining a template profile and simply appending the table structure to the end of the file. Exemplary template profiles are described in ColorSync™ 2.0 Profile Format Specification Draft Version 2.4, Mar. 14, 1994 or International Color Consortium Profile Format Specification, Version 3.0, June 1994 which documents are incorporated here by reference. Additional changes can then be made by updating or adding a calibration date/time tag within the profile and allowing the user to specify media options, rendering intent and the profile name.

This color look-up table can be inverted to provide the reverse relationship, i.e., CMY=f(XYZ), so that information sent to the printer which is expressed in the XYZ color space can be operated upon directly. The original table can be used to proof images for presentation on a monitor.

The above described exemplary embodiments are intended to be illustrative in all respects, rather than restrictive or limitive of the present invention. Thus, the present invention is capable of many variations in detailed implementation that can be derived from the description contained by herein by a person skilled in the art. All such variations and modifications are considered to be within the scope and spirit of the present invention as defined by the appended claims.

What is claimed is:

1. A runtime self calibrating printer comprising:

printing means for receiving test image input and printing an image having a plurality of color samples in response to said test image input on a medium;

means for measuring at least one parameter for each of said plurality of color samples on said medium;

means for receiving said measured parameter data and using said measured parameter data to create a half toning model to estimate resultant colors which characterizes a response of said printer to a variety of image inputs, and for using said model to create values for a multidimensional lookup table; and means for storing said multidimensional lookup table and supplying values from said table to said printing means, wherein said printing means subsequently prints images using image input which is compensated by values from said multidimensional lookup table.

2. The printer of claim 1 wherein said means for measuring at least one parameter further comprises:

a detector which can measure spectral reflectances of said plurality of color samples.

3. The printer of claim 1 wherein said means for measuring at least one parameter further comprises:

a detector which can measure densities of said plurality of color samples.

4. The printer of claim 3, further comprising:

means for storing a prior knowledge of a test target to be printed, a print stock, and ink used; and a means for processing said measured densities to select a corresponding spectral reflectance curve from stored spectral curves.

5. The printer of claim 1, wherein said model comprises an analytical model which provides both dot gain compensation and Yule-Nielsen compensation.

6. The printer of claim 1, wherein said plurality of color samples is less than one hundred samples.

7. A printer comprising:

printing means for receiving image input and printing an image represented by said image input on a medium;

means for inputting a plurality of measured parameter data associated with measurements from a plurality of color samples from a printed media;

means for receiving said measured parameter data and using said data to create an analytical half-toning model which characterizes said printer's response to a variety of image inputs, and for using said half-toning model to create values for a multidimensional lookup table; and means for storing said multidimensional lookup table and supplying values from said table to said printing means, wherein said printing means subsequently prints images using image input which is compensated by values from said multidimensional lookup table.

8. The printer of claim 7, wherein said model comprises an analytical model which provides both dot gain compensation and Yule-Nielsen compensation.

9. The printer of claim 7, wherein said plurality of color samples is less than one hundred samples.

10. A method for generating color lookup tables at runtime comprising the steps of:

printing a test target image having a plurality of color samples thereon;

measuring at least one parameter of each of said color samples;

creating an analytical half-toning model which characterizes a printer used to print said test target based on said at least one parameter;

calculating values for a multidimensional lookup table using said analytical model; and storing said multidimensional lookup table in a memory device.

11. The method of claim 10 further comprising the step of:

printing subsequent images using values from said multidimensional lookup table.

12. The method of claim 10 wherein said step of measuring further comprises the step of:

measuring said at least one parameter internally of said printer.

13. The method of claim 10 wherein said step of measuring further comprises the steps of:

manually measuring said at least one parameter, and inputting said at least one parameter into said printer.

14. The printer of claim 10, wherein said model comprises an analytical model which provides both dot gain compensation and Yule-Nielsen compensation.

15. The method of claim 10, wherein the analytical model estimates half tones of the color samples.

16. The method of claim 10, wherein said step of printing further comprises the step of:

printing a test target image having less than one hundred color samples thereon.

17. A runtime self calibrating color printer comprising:

a print engine which receives image data and prints a corresponding image on a medium;

a sensor which detects spectral reflectance values of a plurality of test color samples on said medium;

a processor for receiving measurement data from said sensor and using said measurement data to create an analytical half-toning model which characterizes the printers input/output response, and which generates a multidimensional lookup table based on said model; and a memory device for storing said multidimensional lookup table and supplying values from said table to said print engine.

18. The printer of claim 17, wherein said model comprises an analytical model which provides both dot gain compensation and Yule-Nielsen compensation.

19. The method of claim 17, wherein said plurality of test color samples number less than one hundred.

20. A color printer comprising:

a print engine which receives image data and prints a corresponding image on a medium;

a sensor which detects spectral reflectance values of a plurality of test color samples on said medium, said plurality of test color samples numbering less than one hundred;

a processor for receiving measurement data based on said less than one hundred samples from said sensor and using said measurement data to create an analytical half-toning model which characterizes the printers input/output response, and which generates a multidimensional lookup table based on said model; and a memory device for storing said multidimensional lookup table and supplying values from said table to said print engine.

* * * * *